Jan. 5, 1954     T. R. HAMMER ET AL     2,665,178
PUMP LINER SPACER STUD
Filed Sept. 14, 1951
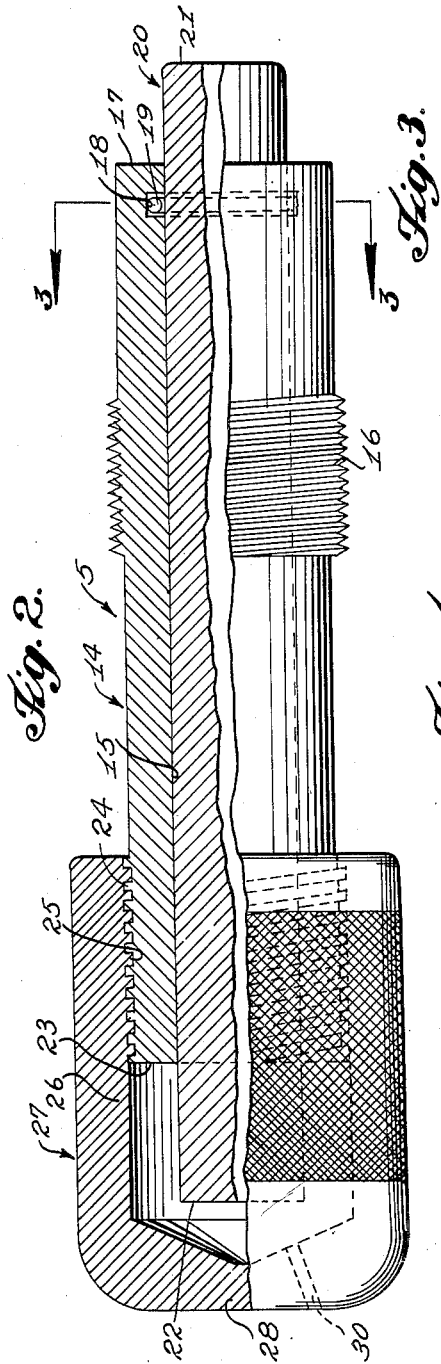
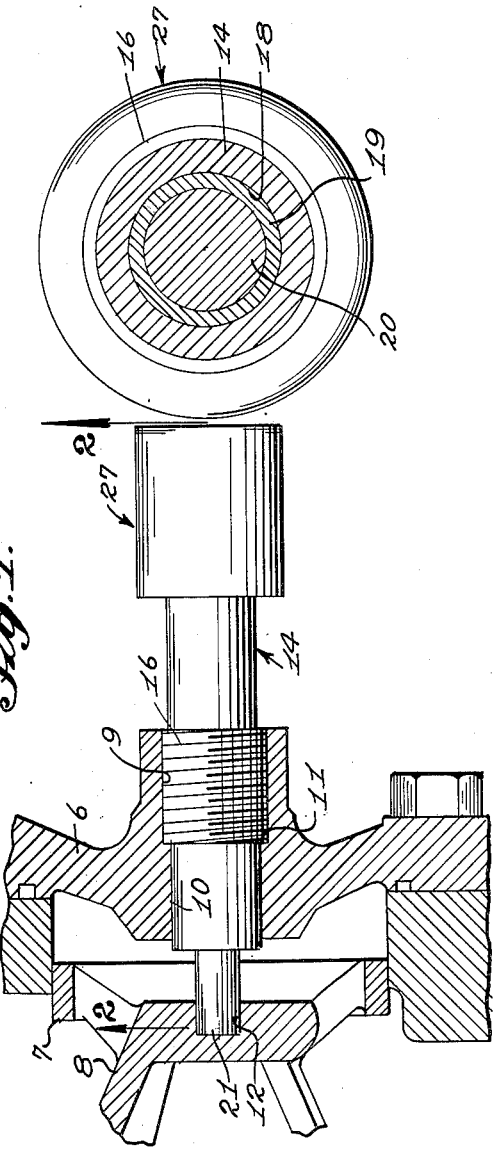
INVENTORS
THOMAS R. HAMMER
HORTON H. INGERSOLL
CLARENCE R. HODGES
BY
McMorrow, Berman & Davidson
ATTORNEYS Patented Jan. 5, 1954

2,665,178

UNITED STATES PATENT OFFICE 2,665,178

PUMP LINER SPACER STUD

Thomas R. Hammer, Horton H. Ingersoll, and Clarence R. Hodges, Edinburg, Tex.

Application September 14, 1951, Serial No. 246,675

3 Claims. (Cl. 309—3)

This invention relates to improved means for spacing and adjusting the liners of reciprocating pumps, such as mud pumps used in oil well and other pumping operations, the primary object of the invention being to provide more practical and efficient devices of this kind which enable adjusting the liners from outside of the pumps and which eliminate contact of the fluid with screw-threads, which is the cause of freezing thereof in the pump head in prior devices of this kind and which usually necessitates removal of the pump head, drilling out of the adjusting screw, and replacement thereof with another adjusting screw, after a short period of use.

Another important object of the invention is the provision of a device of the above-indicated character which involves a body for permanent mounting in the pump head, a smooth unthreaded plunger slidable in the body and engageable with the pump liner, the passage of fluid between the plunger and body being sealed off by a packing ring, and the body being formed with a tell-tale hole which serves to warn of leaking of the packing ring so that it can be replaced before damage is done to threads on the body on which is threaded a nut arranged to adjust the plunger in the operative direction and hold the same in an adjusted position.

Other important objects and advantageous features of the invention will be apparent from the following description and the accompanying drawings, wherein, for purposes of illustration only, a specific embodiment of the invention is set forth in detail.

In the drawings:

Figure 1 is a sectional and elevational view showing a device in accordance with the present invention installed in a reciprocating pump head and in operative relation to a liner;

Figure 2 is an enlarged side elevation, partly in longitudinal section, taken along the line 2—2 of Figure 1; and Figure 3 is a transverse section taken on the line 3—3 of Figure 2.

Referring in detail to the drawings, wherein like numerals designate like parts throughout the several views, the illustrated device, which is generally designated 5, is shown installed in the cylinder head or end 6 of a reciprocating pump involving a cylinder 7 in which the liner-holding cage 8 is positioned. The cylinder head or end 6 is formed with a threaded bore 9 whose axially inward end terminates in a reduced-diameter, smooth bore 10 which opens into the interior of the cylinder 7, the two bores together defining a stop shoulder 11 at the inward end of the threaded bore 9. The liner cage 8 has a central socket 12.

The illustrated pump liner spacer stud 5 comprises a cylindrical, tubular body 14 having a smooth, axial bore 15 extending therethrough. The body 14 is externally smooth and of a diameter to have a snug sliding fit in the cylinder head bore 10. An enlarged diameter, externally screw-threaded portion 16 on the body 14 is arranged to thread into and is preferably the same length as the threaded bore 9 of the head 6, the externally threaded portion 16 being spaced from the rearward end 17 of the body so that the end 17 is exposed at the inward side of the head 6 when the device is in place, as shown in Figure 1.

The body 14 is formed internally at a point closely spaced from the inward end 17 with an annular groove 18 which opens into the bore 15 and in which is compressed an O-ring or circular packing ring 19, which, while in good condition, prevents fluid from the cylinder 7 passing outwardly therefrom between the wall of the bore 15 and the plunger 20.

The plunger 20 is in the form of a smooth, round rod snugly and slidably fitting the body bore 15 and substantially longer than the body 14 so as to have an inward or forward end 21 projecting beyond the corresponding end 17 of the body 14 and an outer or rearward end 22 projecting beyond the outer or rearward end 23 of the body 14. As shown in Figure 1, the inner end 21 of the plunger 20 normally engages in the socket 12 of the liner cage 8 for holding the same in position in the cylinder 7 relative to and spaced inwardly from the head 6.

The outer or rearward end of the body 14 has thereon heavy square screw-threads 24 with which are engaged the matching similar screw-threads 25 in the forward part of a cap nut 27 having a conical end wall 28 adapted to bear against the outer end 22 of the plunger 20. It will be noted that the nut threads 25 project inwardly from the nut side wall 26 so that the cap nut 27 can be moved forwardly relative to the body 14 to engage its end wall 28 with the plunger 20 and force the same forwardly in the body 14 to a desired adjusted position and hold the liner cage 8 in place.

It will be obvious from the foregoing that fluid from the pump being prevented by the O-ring 19 from traveling outwardly between the body 14 and the plunger 20, such fluid cannot reach the screw threads 24 and 25 and freeze them as hereinabove indicated. As a result, the nut 27 and plunger do remain freely operable so that when installation of a different sized or new pump liner is required, the operation can be easily and quickly performed without involving drilling out the plunger 20 or other laborious operations. A tell tale hole 30 is provided in the end wall 28 of the cap nut 27 to show if any leakage of fluid is taking place therein.

What is claimed is:

1. In a pump liner spacer stud, an elongated body having an end portion adapted to be mounted through the head of a pump cylinder having a liner cage therein, said body being formed with a smooth longitudinal bore extending therethrough and having another end portion, a smooth plunger longer than said body and extending beyond both ends of said body, said plunger being slidably engaged with said bore with one end thereof arranged to engage the liner cage within the cylinder, and an adjustable cap nut threaded on said other end portion of the body and engaging the adjacent end of the plunger, said bore of the body being formed in its side wall with a concentric annular recess located close to the end of said body remote from the cap nut, and a packing ring confined in said annular recess and circumposed on said plunger.

2. In combination, a pump cylinder having a head formed with an axial bore extending therethrough and a liner cage within the cylinder and axially spaced from the head, an elongated tubular body having a first end portion extending through said bore, means receivably securing said first end portion in said bore, said body having a smooth bore extending therethrough and having a second end portion, a smooth plunger longer than said body, said plunger extending slidably through the bore body and extending beyond the ends of said body with one end of said plunger engaging said liner cage, and an adjustable cap nut threaded on the second end portion of the body and engaging the adjacent end of the plunger, the bore of the body being formed in its side wall with an annular concentric recess located in said first end portion of the body, and a packing ring compressed in said recess and circumposed on the plunger to prevent passage of fluid from the cylinder toward the second end portion of the body between the plunger and the bore side wall.

3. In combination, a pump cylinder having a head formed with an axial bore extending therethrough and a liner cage within the cylinder and axially spaced from the head, an elongated tubular body having a first end portion extending through said bore, means receivably securing said first end portion in said bore, said body having a smooth bore extending therethrough and having a second end portion, a smooth plunger longer than said body, said plunger extending slidably through the bore body and extending beyond the ends of said body with one end of said plunger engaging said liner cage, and an adjustable cap nut threaded on the second end portion of the body and engaging the adjacent end of the plunger, the bore of the body being formed in its side wall with an annular concentric recess located in said first end portion of the body, and a packing ring compressed in said recess and circumposed on the plunger to prevent passage of fluid from the cylinder toward the second end portion of the body between the plunger and the bore side wall, said cap nut being formed with a tell-tale hole communicating with the space between the plunger, the adjacent end of the body, and the interior of the cap nut.

THOMAS R. HAMMER.
HORTON H. INGERSOLL.
CLARENCE R. HODGES.

References Cited in the file of this patent

UNITED STATES PATENTS

| Number | Name | Date |
|---|---|---|
| 767,526 | Paulson | Aug. 16, 1904 |
| 1,584,843 | Carroll | May 18, 1926 |
| 1,768,799 | Stanley | July 1, 1930 |
| 2,045,024 | Renken et al. | June 23, 1936 |
| 2,282,254 | Shimer | May 5, 1942 |